US006234606B1

(12) United States Patent
Suzuki

(10) Patent No.: US 6,234,606 B1
(45) Date of Patent: May 22, 2001

(54) IMAGE PRINTING APPARATUS, METHOD OF CONTROLLING THE SAME, AND PRINTING APPARATUS

(75) Inventor: Kenichi Suzuki, Isehara (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/266,580

(22) Filed: Mar. 11, 1999

(30) Foreign Application Priority Data

Mar. 13, 1998 (JP) ........................................ 10-063207
Mar. 8, 1999 (JP) ........................................ 11-060670

(51) Int. Cl.[7] .............................. B41J 2/21; G01D 11/00
(52) U.S. Cl. .............................................. 347/43; 347/100
(58) Field of Search ................................ 347/40, 85, 43, 347/100

(56) References Cited

U.S. PATENT DOCUMENTS 4,313,124 1/1982 Hara ...................................... 347/57
4,345,262 8/1982 Shirato et al. ......................... 347/10
4,459,600 7/1984 Sato et al. ............................. 347/47
4,463,359 7/1984 Ayata et al. ........................... 347/56
4,558,333 12/1985 Sugitani et al. ....................... 347/65
4,608,577 8/1986 Hori ...................................... 347/66
4,723,129 2/1988 Endo et al. ........................... 347/56
4,740,796 4/1988 Endo et al. ........................... 347/56

FOREIGN PATENT DOCUMENTS 0 610 096 8/1994 (EP) .
0 654 352 5/1995 (EP) .
0 686 507 12/1995 (EP) .
54-056847 5/1979 (JP) .
59-123670 7/1984 (JP) .
59-138461 8/1984 (JP) .
60-071260 4/1985 (JP) .
6-226998 8/1994 (JP) .
9-78423 3/1997 (JP) .

*Primary Examiner*—Thinh Nguyen
(74) *Attorney, Agent, or Firm*—Fitzpatrick, Cella, Harper & Scinto

(57) ABSTRACT

An image printing apparatus includes color print heads capable of ejecting color ink of at least one type, monochromatic print heads capable of ejecting monochromatic ink, and a printing control section for causing the print heads to eject the ink onto a sheet while moving the print heads relative to the sheet to selectively print a color image or a monochromatic image. The number of density types of the monochromatic ink is greater than that of the color ink.

16 Claims, 10 Drawing Sheets

FIG. 2B

| No. | C1 | C2 | DYE AMOUNT | NUMBER OF DOTS | REFLECTION DENSITY | DENSITY LEVEL dl [x] | th[x] |
|---|---|---|---|---|---|---|---|
| 0 | 2 | 0 | 7.00 | 2 | 2.51 | 0 | |
| 1 | 1 | 0 | 3.50 | 1 | 1.88 | 66 | 33 |
| 2 | 0 | 2 | 1.80 | 2 | 0.90 | 164 | 115 |
| 3 | 0 | 1 | 0.90 | 1 | 0.51 | 204 | 184 |
| 4 | 0 | 0 | 0.00 | 0 | 0.00 | 255 | 229 |
| No. | M1 | M2 | DYE AMOUNT | NUMBER OF DOTS | REFLECTION DENSITY | DENSITY LEVEL dl [x] | th[x] |
| 0 | 2 | 0 | 7.00 | 2 | 2.38 | 0 | |
| 1 | 1 | 0 | 3.50 | 1 | 1.58 | 86 | 43 |
| 2 | 0 | 2 | 1.80 | 2 | 0.86 | 163 | 124 |
| 3 | 0 | 1 | 0.90 | 1 | 0.49 | 203 | 183 |
| 4 | 0 | 0 | 0.00 | 0 | 0.00 | 255 | 229 |
| No. | Y1 | Y2 | DYE AMOUNT | NUMBER OF DOTS | REFLECTION DENSITY | DENSITY LEVEL dl [x] | th[x] |
| 0 | 2 | 0 | 7.00 | 2 | 2.38 | 0 | |
| 1 | 1 | 0 | 3.50 | 1 | 1.58 | 86 | 43 |
| 2 | 0 | 2 | 1.80 | 2 | 0.86 | 163 | 124 |
| 3 | 0 | 1 | 0.90 | 1 | 0.49 | 203 | 183 |
| 4 | 0 | 0 | 0.00 | 0 | 0.00 | 255 | 229 |

FIG. 2C

| No. | K1 | K2 | K3 | K4 | K5 | K6 | DYE AMOUNT | NUMBER OF DOTS | REFLEC-TION DENSITY | DENSITY LEVEL dl [x] | th[x] |
|---|---|---|---|---|---|---|---|---|---|---|---|
| 0 | 3 | 0 | 0 | 0 | 0 | 0 | 14.40 | 3 | 2.53 | 0 | 0 |
| 1 | 1 | 1 | 2 | 0 | 0 | 0 | 9.60 | 4 | 2.39 | 224 | 112 |
| 2 | 1 | 1 | 1 | 0 | 0 | 1 | 8.55 | 4 | 2.30 | 368 | 288 |
| 3 | 1 | 1 | 0 | 1 | 0 | 0 | 7.80 | 3 | 2.22 | 512 | 432 |
| 4 | 1 | 1 | 0 | 0 | 0 | 1 | 7.35 | 3 | 2.16 | 608 | 560 |
| 5 | 1 | 0 | 1 | 1 | 1 | 0 | 6.90 | 4 | 2.09 | 704 | 656 |
| 6 | 1 | 0 | 1 | 0 | 1 | 1 | 6.45 | 4 | 2.01 | 832 | 768 |
| 7 | 0 | 2 | 1 | 0 | 0 | 0 | 6.00 | 3 | 1.93 | 960 | 896 |
| 8 | 0 | 2 | 0 | 1 | 1 | 0 | 5.70 | 4 | 1.87 | 1056 | 1008 |
| 9 | 0 | 1 | 2 | 1 | 0 | 0 | 5.40 | 4 | 1.81 | 1168 | 1120 |
| 10 | 0 | 1 | 2 | 0 | 1 | 0 | 5.10 | 4 | 1.74 | 1280 | 1216 |
| 11 | 0 | 1 | 1 | 2 | 0 | 0 | 4.80 | 4 | 1.67 | 1392 | 1328 |
| 12 | 0 | 1 | 1 | 1 | 1 | 0 | 4.50 | 4 | 1.60 | 1504 | 1440 |
| 13 | 0 | 1 | 1 | 1 | 0 | 1 | 4.35 | 4 | 1.56 | 1568 | 1536 |
| 14 | 0 | 1 | 1 | 1 | 0 | 0 | 4.20 | 3 | 1.52 | 1632 | 1600 |
| 15 | 0 | 1 | 1 | 0 | 1 | 1 | 4.05 | 4 | 1.48 | 1696 | 1664 |
| 16 | 0 | 1 | 1 | 0 | 1 | 0 | 3.90 | 3 | 1.43 | 1760 | 1728 |
| 17 | 0 | 1 | 1 | 0 | 0 | 1 | 3.75 | 3 | 1.39 | 1840 | 1808 |
| 18 | 0 | 1 | 0 | 1 | 2 | 0 | 3.60 | 4 | 1.35 | 1904 | 1872 |
| 19 | 0 | 1 | 0 | 1 | 1 | 1 | 3.45 | 4 | 1.30 | 1984 | 1936 |
| 20 | 0 | 1 | 0 | 1 | 1 | 0 | 3.30 | 3 | 1.26 | 2048 | 2016 |
| 21 | 0 | 0 | 2 | 1 | 0 | 1 | 3.15 | 4 | 1.21 | 2128 | 2096 |
| 22 | 0 | 0 | 2 | 1 | 0 | 0 | 3.00 | 3 | 1.16 | 2208 | 2160 |
| 23 | 0 | 0 | 2 | 0 | 1 | 1 | 2.85 | 4 | 1.12 | 2288 | 2240 |
| 24 | 0 | 0 | 1 | 2 | 1 | 0 | 2.70 | 4 | 1.07 | 2368 | 2320 |
| 25 | 0 | 0 | 1 | 2 | 0 | 1 | 2.55 | 4 | 1.02 | 2448 | 2400 |
| 26 | 0 | 0 | 1 | 1 | 2 | 0 | 2.40 | 4 | 0.96 | 2528 | 2480 |
| 27 | 0 | 0 | 1 | 1 | 1 | 1 | 2.25 | 4 | 0.91 | 2608 | 2576 |
| 28 | 0 | 0 | 1 | 1 | 1 | 0 | 2.10 | 3 | 0.86 | 2704 | 2656 |
| 29 | 0 | 0 | 1 | 1 | 0 | 1 | 1.95 | 3 | 0.80 | 2784 | 2736 |
| 30 | 0 | 0 | 1 | 1 | 0 | 0 | 1.80 | 2 | 0.75 | 2880 | 2832 |
| 31 | 0 | 0 | 1 | 0 | 1 | 1 | 1.65 | 3 | 0.69 | 2960 | 2928 |
| 32 | 0 | 0 | 0 | 2 | 0 | 2 | 1.50 | 4 | 0.63 | 3056 | 3008 |
| 33 | 0 | 0 | 0 | 1 | 2 | 1 | 1.35 | 4 | 0.57 | 3152 | 3104 |
| 34 | 0 | 0 | 0 | 1 | 1 | 2 | 1.20 | 4 | 0.51 | 3248 | 3200 |
| 35 | 0 | 0 | 0 | 1 | 1 | 1 | 1.05 | 3 | 0.45 | 3344 | 3296 |
| 36 | 0 | 0 | 0 | 1 | 1 | 0 | 0.90 | 2 | 0.39 | 3456 | 3392 |
| 37 | 0 | 0 | 0 | 1 | 0 | 1 | 0.75 | 2 | 0.33 | 3552 | 3504 |
| 38 | 0 | 0 | 0 | 0 | 1 | 2 | 0.60 | 3 | 0.27 | 3648 | 3600 |
| 39 | 0 | 0 | 0 | 0 | 1 | 1 | 0.45 | 2 | 0.20 | 3760 | 3712 |
| 40 | 0 | 0 | 0 | 0 | 0 | 2 | 0.30 | 2 | 0.13 | 3856 | 3808 |
| 41 | 0 | 0 | 0 | 0 | 0 | 1 | 0.15 | 1 | 0.07 | 3968 | 3920 |
| 42 | 0 | 0 | 0 | 0 | 0 | 0 | 0.00 | 0 | 0.00 | 4080 | 4032 |

IMAGE PRINTING APPARATUS, METHOD OF CONTROLLING THE SAME, AND PRINTING APPARATUS

BACKGROUND OF THE INVENTION

1. Field of the Invention

The present invention relates to an image printing apparatus, a method of controlling the same, and a printing apparatus.

2. Description of Related Art

In recent years, color printers capable of printing color images on printing media are popularly used. However, when a monochromatic image of characters or the like is to be printed by a color printer, the printing speed decreases, as will be described later. As a solution to this problem, a color printer which has both a color ink head for printing a color image and a black ink head for printing a binary image and selectively uses them as needed to allow printing both a color image and a monochromatic image on one printing medium has been used.

In the medical field where radiographs or CT/MRI images are used, monochromatic images are still used in many cases. This is because the density resolution of human eyes is high. In the medical field where high density resolution is required, a larger quantity of information can be visually recognized from a monochromatic image than from a color image.

Additionally, as is known, the density resolution of human eyes is higher for a transparent printing medium than for a reflective printing medium. It is generally said that human eyes have density resolution of about 8 bits for a color image and 10 to 11 bits for a monochromatic transmission image.

A radiograph or CT/MRI image is printed on a transparent printing medium and provided as a medical image. A doctor reads the image at the critical density resolution of human eyes, thereby obtaining a diagnostic result. Although images are used in the medical field, ultrasonic diagnosis, nuclear medical apparatuses, endoscopes, retinal cameras, and pathological microscopes often use color images for the purpose of obtaining color vital information or expressing functional vital information such as blood stream states.

Conventionally, printing apparatuses for printing color images and those for printing monochromatic high-gradation images are independently prepared and selectively used. For this reason, a color image and a monochromatic high-gradation image cannot be simultaneously printed on one printing medium. Management of printed images is also cumbersome.

There are also color image printing apparatuses capable of printing monochromatic images. However, they are poorer in gradation expression than printing apparatuses exclusively used to print monochromatic images. In addition, a printing medium for color image printing and that for monochromatic image printing need be selectively used depending on applications.

An example of such an apparatus is a sublimation thermal transfer printer. In this apparatus, three ink ribbons (dyes) of Y, M, and C or R, G, and B are prepared. An ink ribbon overlapping a printing medium is partially heated by a thermal head to transfer the dye of the ink ribbon to the medium, thereby forming an image. When the same process is repeated three times for the respective ink ribbons, a color image can be formed. To print a monochromatic image by this scheme, the three different color inks are uniformly overlaid. In this scheme, however, a monochromatic image is expressed by overlaying three colors, and it is difficult to express a neutral monochrome without any color appearance. In addition, a sufficient monochromatic density (e.g., OD3) cannot be expressed particularly for a transparent medium.

For this reason, when a neutral monochromatic density or sufficiently high monochromatic density is required, a heat-sensitive medium for printing monochromatic images is independently prepared and partially heated by the thermal head. By blackening the heated portion, an image is obtained. That is, a medium for color images is exchanged with the medium for monochromatic images, and the ink ribbons are detached as needed.

As another example, there is an ink-jet printer. In this scheme, three different color inks: Y, M, and C or R, G, and B are prepared and overlaid to express a color image. In this case as well, a monochromatic image can be expressed by uniformly overlaying the three colors. However, a neutral monochrome without any color appearance can hardly be expressed because the three colors are overlaid, as in the sublimation thermal transfer printer. To express a sufficient monochromatic density (e.g., OD3) particularly for a transparent medium, inks must be overlaid on the same pixel. However, the ink absorption amount of a medium is limited, so a sufficient monochromatic density cannot be expressed. More specifically, to realize the gradation of an image or increase the density, inks are overlaid on the same pixel. However, the ink absorption amount of a printing medium is limited. If inks are overlaid beyond this limitation, inks overflow to blur the image.

SUMMARY OF THE INVENTION

The present invention has been made in consideration of the above problem, and has as its object to provide an image printing apparatus capable of printing a color image and a high appearance quality of monochromatic high-gradation image without exchanging a printing medium or ink ribbons and also printing a color image and a monochromatic high-gradation image on one printing medium as needed, an apparatus for controlling the same, and a printing apparatus.

To solve the above-described problem and achieve the above object, an image printing apparatus of the present invention has the following arrangement.

An image printing apparatus of the present invention comprises a first print nozzle group capable of ejecting at least one color ink, a second print nozzle group capable of ejecting black ink, and print control means for causing the first and second print nozzle groups to eject the inks onto a printing medium while moving the first and second print nozzle groups relative to the printing medium to selectively print a color image and a monochromatic image, wherein the density types (levels) of the black inks are increased as compared to those of any color ink.

In order to achieve the above problem, in the present invention, monochromatic inks of a larger number of density types than that of one color of Y, M, and C or R, G, and B inks, which has the largest number of density types, are prepared. An image to be printed is separated into monochromatic and color regions, and the color region image is printed with the color inks, and the monochromatic region image is printed with the monochromatic inks.

A method of controlling an image printing apparatus of the present invention has the following characteristic features.

In an image printing apparatus comprising a first print nozzle group capable of ejecting at least one color ink, a second print nozzle group capable of ejecting black ink, and print control means for causing the first and second print nozzle groups to eject the inks onto a printing medium while moving the first and second print nozzle groups relative to the printing medium to selectively print a color image and a monochromatic image, wherein the density types of the black inks are increased as compared to those of any color ink, the printing control means prints a color image and a monochromatic image having a higher gradation level than that of each color of the color image on one printing medium, and prints the color image and the monochromatic image in different print regions on one printing medium.

With this arrangement, the number of times of overprinting one pixel can be decreased, and the gradation and high density of a monochromatic image can be expressed.

A printing apparatus of the present invention has the following arrangement.

In a printing apparatus for performing gradation-printing using a plurality of black inks having different densities and color inks, the number of gradation levels which can be expressed by the plurality of black inks is larger than the number of gradation levels which can be expressed by the color ink.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2B is a view showing a table corresponding to the gray levels of color inks in printing using chromatic inks;

FIG. 2C is a view showing a table corresponding to the gray levels of inks in printing using monochromatic inks;

DETAILED DESCRIPTION OF THE PREFERRED EMBODIMENTS

The embodiments of the present invention will be described below with reference to the accompanying drawings.

[Mechanical Arrangement]

Figure 1:
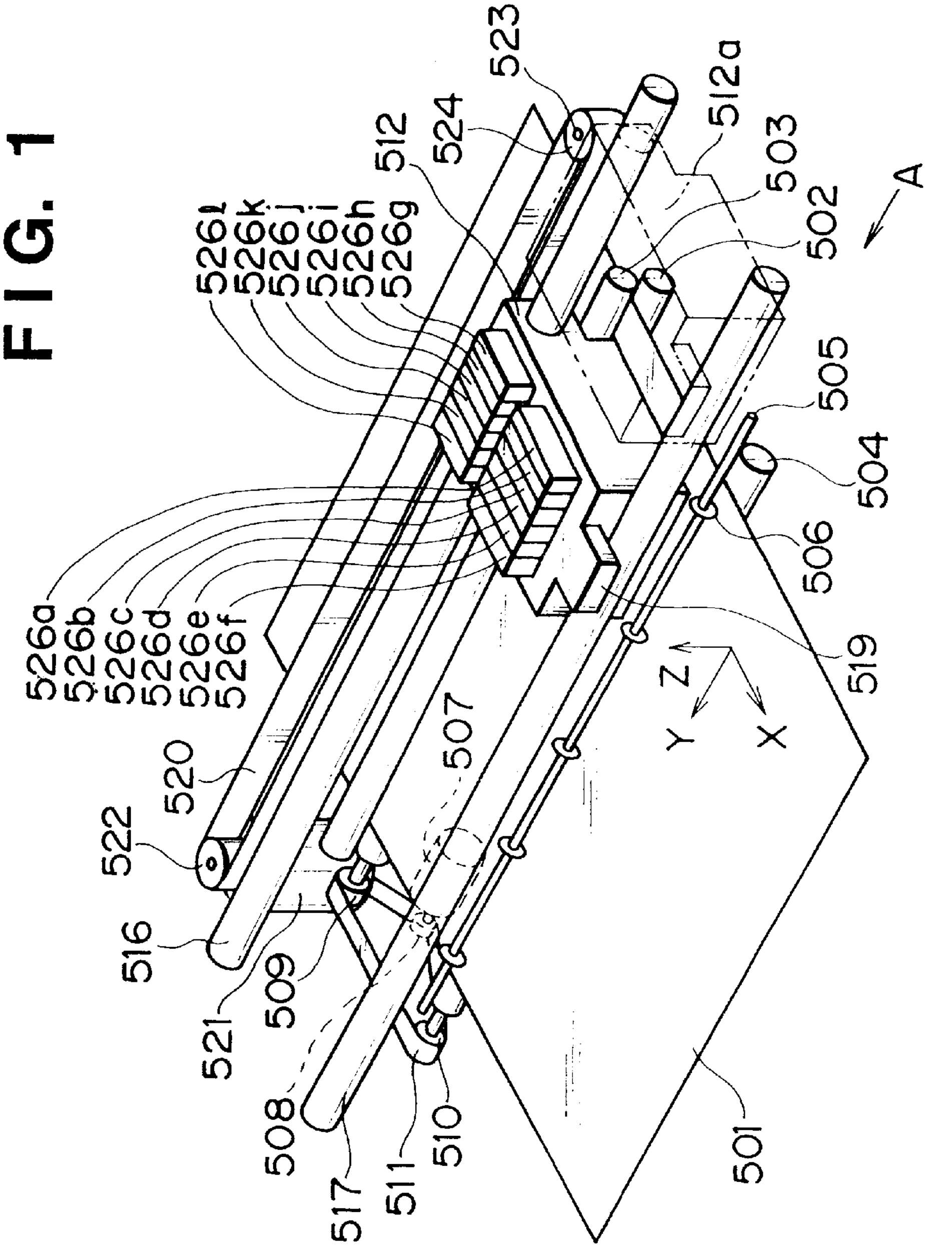
FIG. 1 is a perspective view showing the main unit of an ink-jet printing apparatus of the first embodiment.
Figure 2A:
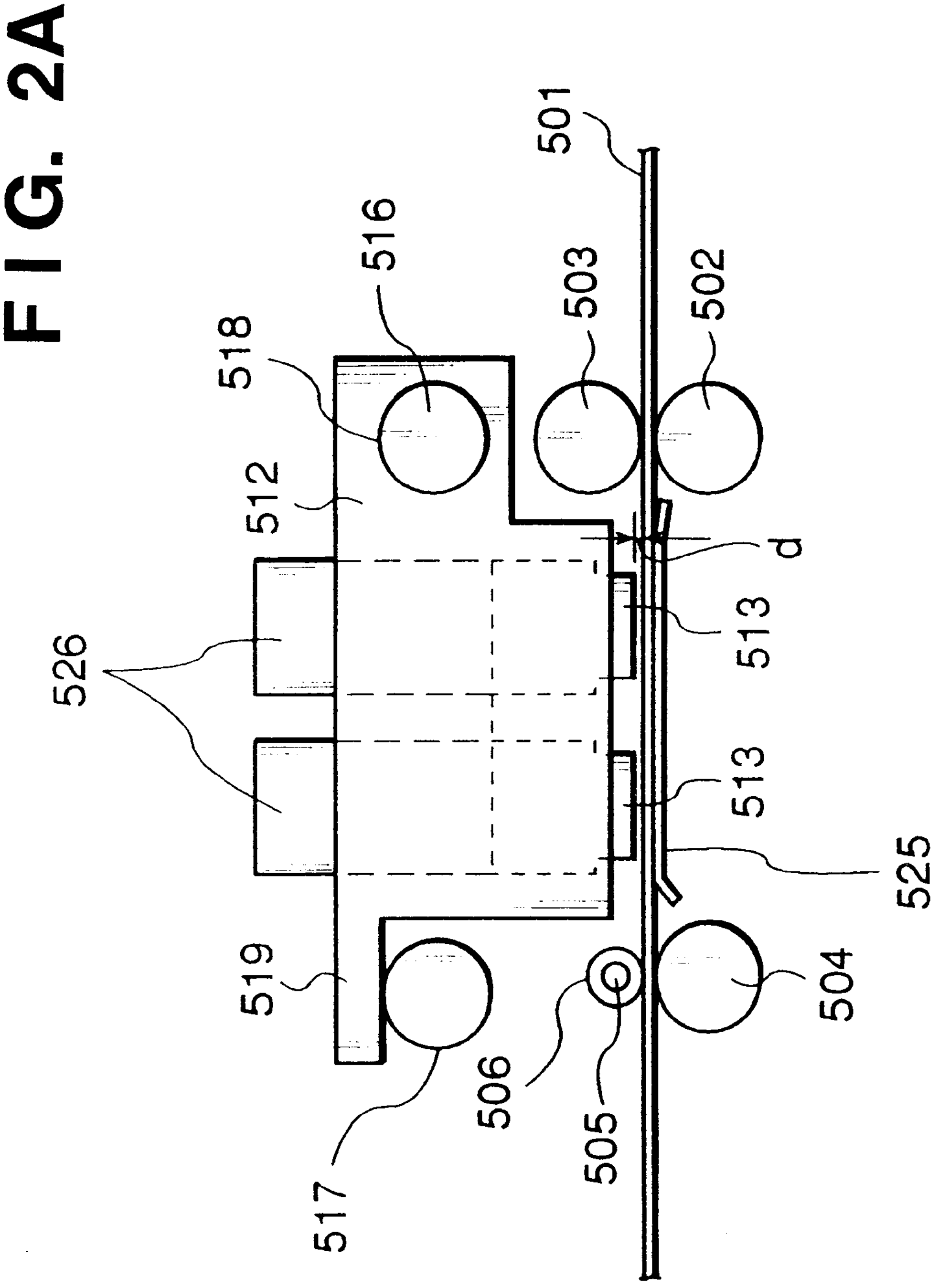
FIG. 2A is a side view when viewed from a direction indicated by an arrow A in FIG. 1.
Figure 3:
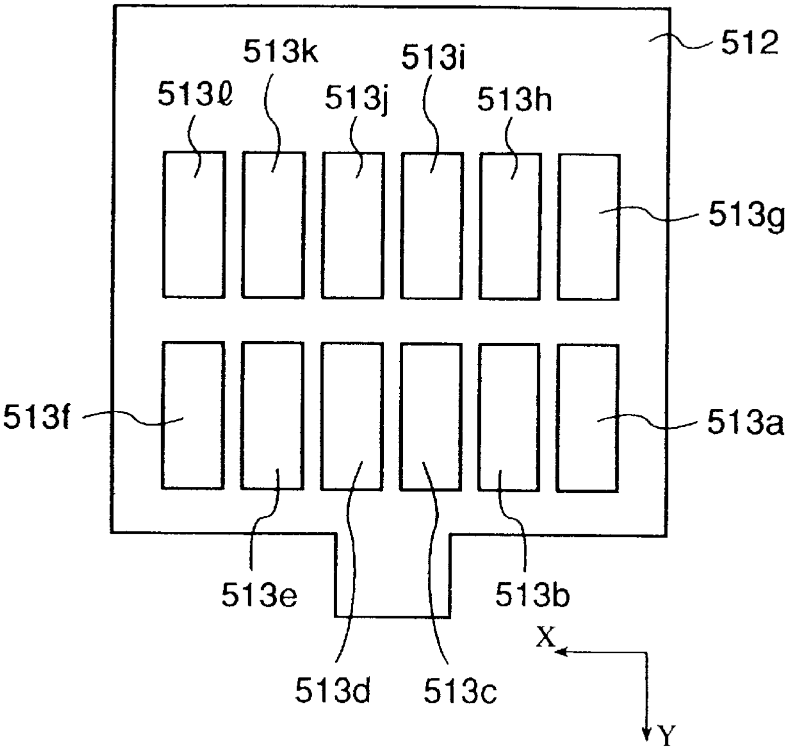
FIG. 3 is a view showing details of the apparatus shown in FIG. 1.
Figure 4A:
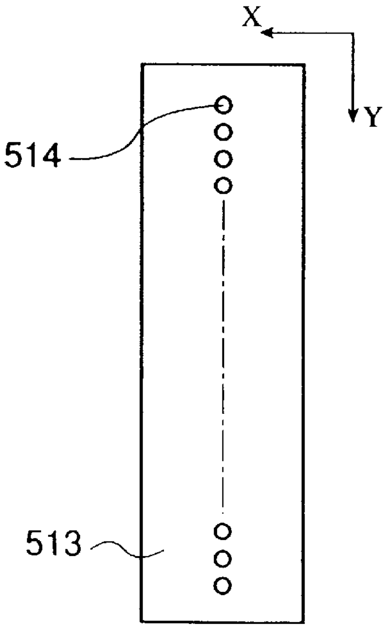
FIGS. 4A and 4B are views showing details of the apparatus shown in FIG. 1.
Figure 4B:
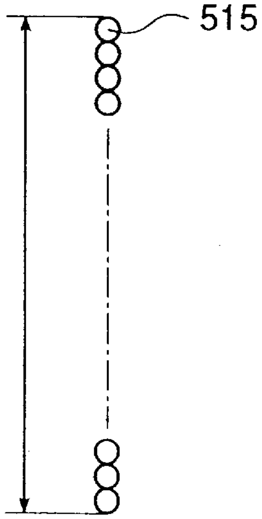

FIG. 1 is a perspective view showing the main unit (printing unit) of an ink-jet printing apparatus according to an embodiment of the present invention. FIG. 2A is aside view of the main part when viewed from a direction indicated by a narrow A in FIG. 1. FIGS. 3, 4A, and 4B are views showing details of a printhead shown in FIG. 1.

Referring to FIGS. 1 and 2A, reference numeral 501 denotes a sheet on which an image is printed; and 502, 503, 504, and 505, rollers paired to convey the sheet in the X direction. The roller 505 has large-diameter portions 506 arranged in the longitudinal direction at a predetermined interval. The large-diameter portions 506 come into contact with the sheet. Reference numeral 507 denotes a motor; 508, a pulley attached to the motor shaft; and 509 and 510, pulleys each attached to one end of a corresponding one of the rollers 502 and 504. The pulleys 509 and 510 are coupled to the pulley 508 with a belt 511, so the rollers 502 and 504 rotate in accordance with rotation of the motor. The rollers 503 and 505 are biased by a biasing means (not shown) to press the rollers 502 and 504, respectively, so the sheet is sandwiched by the rollers and conveyed in the X direction.

A carriage 512 has a plurality of heads 513*a* to 513*l*. Each head has a number of nozzles at positions opposite to the sheet surface, as shown in FIG. 4A. Shafts 516 and 517 slidably hold the carriage. The shaft 516 extends through a hole 518 formed in the carriage. A projecting portion 519 extending from the carriage 512 abuts against the shaft 517.

In the above arrangement, the nozzle surfaces of the heads 513 are arranged to oppose the sheet while setting a predetermined clearance d therebetween. A belt 520 partially fixed to the carriage 512 couples a pulley 522 attached to the drive shaft of a motor 521 to a pulley 524 rotatably attached to a fixed shaft 523.

With the above arrangement, the carriage can reciprocally move along the Y direction in accordance with rotation of the motor 521. The carriage can move across the sheet in the Y direction, i.e., between a home position 512*a* of the carriage and a position symmetric to the home position 512*a* with respect to the sheet. While the carriage is moving on the sheet, the predetermined clearance d is held between the nozzle surfaces and sheet. Ink cartridges 526*a* to 526*l* storing ink are attached to the heads 513*a* to 513*l*, respectively to supply ink to the heads. The head cartridges 526 can be detached from the heads 513. When ink in an ink cartridge is consumed, the cartridge is detached, and a new ink cartridge is attached to supply ink.

Twelve different ink cartridges are provided: light and dark cyan, light and dark magenta, light and dark yellow, and black inks with different densities sequentially on the ink cartridge 526*a*. These ink cartridge types correspond second nozzle groups for black ink having six nozzle groups 513*g*–513*l* and second nozzle groups for color ink having six nozzle groups 513*a*–513*f*. Instead of these inks, light and dark red, light and dark green, and light and dark blue and black inks with different densities may be provided sequentially on the ink cartridge 526*a*. These cartridges can be attached to the heads 513*a* to 513*l*, respectively. A sheet guide 525 is inserted between the rollers 502 and 504. The sheet is vacuum-suctioned by a suction device (not shown) toward the lower side of FIG. 2 and brought into tight contact with the sheet guide by the suction force. With this arrangement, floating of the sheet is prevented. When the sheet floats, the clearance d cannot be maintained, and the sheet may contact the heads. In FIG. 4B, reference numeral 515 denotes a dot formed on the sheet when ink is ejected from a nozzle onto the sheet.

In this example, the respective colors use different heads. However, heads for the plurality of colors or densities may be integrally formed. In this case, the interior of one head is divided into a plurality of nozzle groups, and a color or density is assigned to each nozzle group.

[Electrical Circuit Arrangement]

Figure 5:
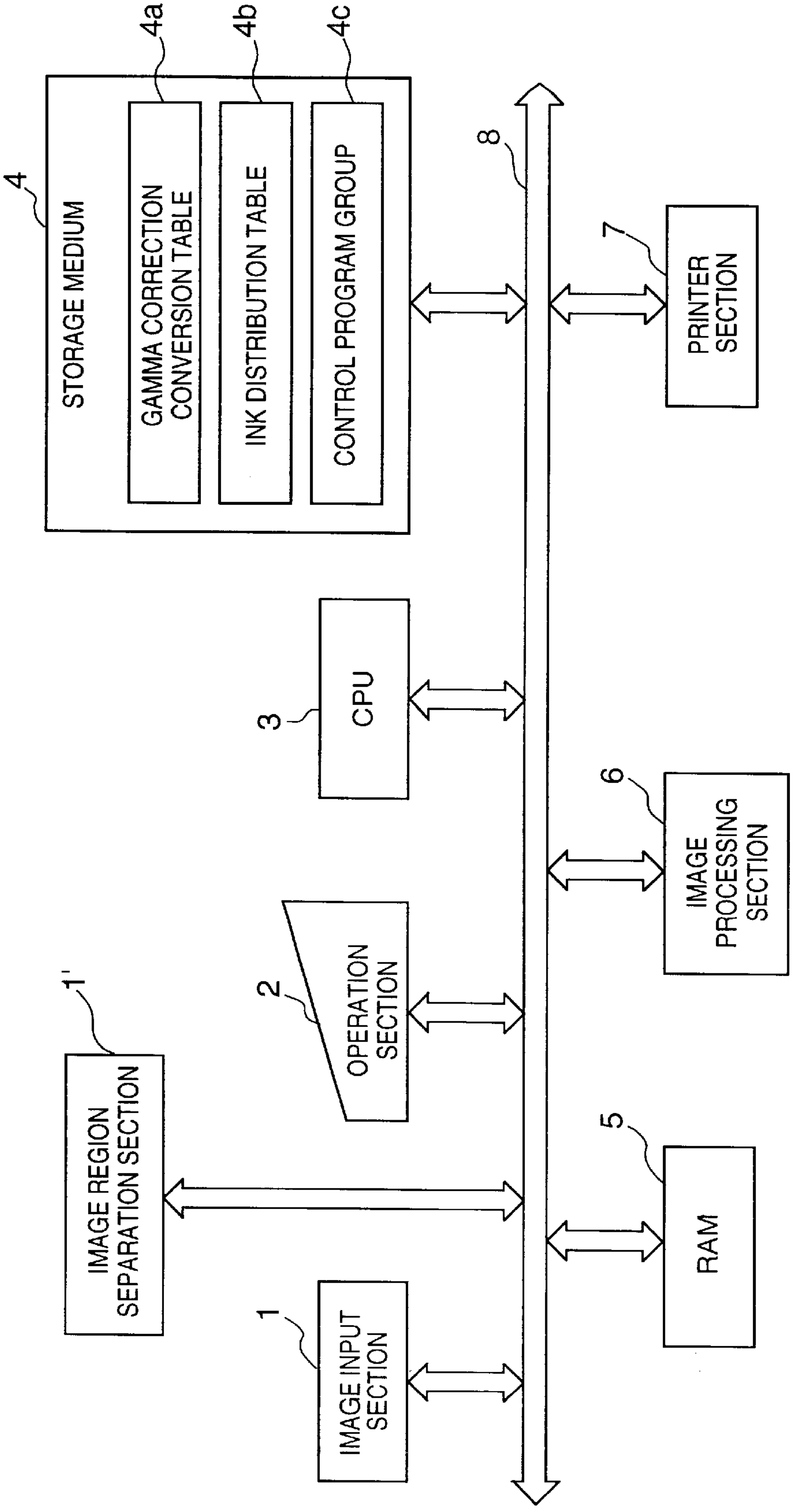
FIG. 5 is a control block diagram of the ink-jet printing apparatus of the first embodiment.

FIG. 5 is a block diagram of a control circuit for controlling various sections of the ink-jet printing apparatus of this embodiment.

As shown in FIG. 5, an image input section 1 receives image data through an external device such as a scanner or a network. An image region separation section 1' separates image data input to the image input section 1 into a monochromatic image region and a color image region. For a monochromatic image region, density data is obtained in units of pixels. For a color image region, each of three color-separated density data: cyan, magenta, and yellow, or red, green, and blue is obtained in units of pixels. An operation section 2 has various keys for setting parameters and instructing the start of printing. A CPU 3 controls the entire printing apparatus in accordance with various programs in a storage medium.

A storage medium 4 stores programs and the like used to operate the printing apparatus in accordance with a control program or an error processing program. In this embodiment, all operations are based on these programs. As the printing medium 4 for storing the programs, a ROM, an FD, a CD-ROM, an HD, a memory card, a magnetooptical disk, or the like can be used.

In the storage medium 4, reference numeral 4*a* denotes a gamma correction conversion table looked up in gamma correction processing; 4*b,* an ink type distribution table (ink type combination table) looked up in ink type distribution processing to be described later; and 4*c,* a program group storing various programs.

A RAM 5 is used as the work area of various programs in the storage medium 4, the temporary shunt area for error processing, or the work area of image processing. Image processing may be performed by copying various tables in the printing medium 4 into the RAM 5, then, changing the table contents, and looking up the changed tables.

An image processing section 6 creates an eject pattern for realizing a high gradation level by the ink-jet printer on the basis of an input image.

A printer section 7 forms a dot image on the basis of the eject pattern created by the image processing section in printing and includes the print unit shown in FIG. 1. A bus line 8 transmits address signals, data, control signals, and the like in the apparatus.

[Image Processing Section]

Figure 6:
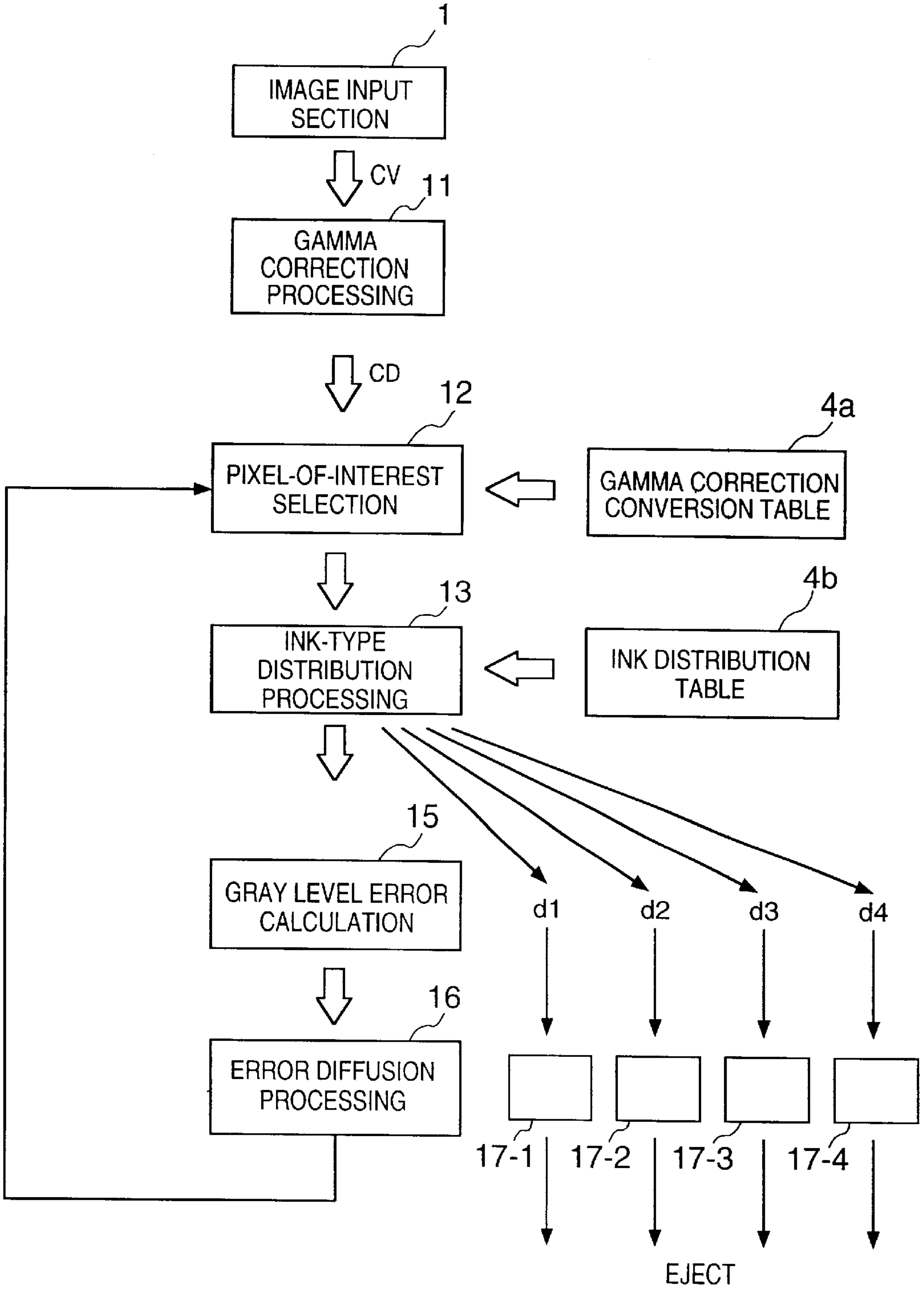
FIG. 6 is a block diagram of an image processing section.

The image processing section 6 will be described next with reference to FIG. 6.

In gamma correction processing 11, an image signal CV input by the image input section 1 is converted into a signal CD representing a density using the gamma correction conversion table 4*a* prepared for each color of monochromatic and color images, and stored in the page memory region of the image processing work area of the RAM 5. In this embodiment, each level of a monochromatic image is expressed by the value CD of 12-bit level, and each level of a color image is expressed by the value CD of 8-bit level.

In pixel-of-interest selection 12, one pixel to be processed is selected in the page memory region, and the density data CD is obtained.

In ink type distribution processing 13, the ink type distribution table 4*b* is looked up on the basis of the value CD of the pixel of interest to select an ink type combination for expressing a density close to the density CD of the pixel of interest. In density of gray level error calculation 15, the difference of the density expressed by the ink combination selected in ink type distribution processing 13 and the value CD of the pixel of interest is calculated. On the basis of this combination, binary signals d1, d2, d3, . . . for instructing ejection/non-ejection of the heads for the densities are determined.

In error diffusion processing 16, the difference value is distributed to peripheral pixels which have not been subjected to ink type distribution processing yet, by a predetermined method, and added/subtracted to/from the value CD of each pixel.

With the above processing, processing of the pixel of interest is complete.

The ink type distribution table 4*b* will be described.

In the ink type distribution table 4*b* associated with the types or densities of inks, pieces of density information of inks to be used or inks used for printing are recorded. In this embodiment, use combinations and density information of the following light and dark CMY color inks and use combinations and density information of light and dark black inks in the achromatic region are included. A total of six CMY colors and a total of six black inks are used. The densities of inks are represented by suffixes 1, 2, 3, . . . in the descending order of densities. Table 1 shows the dye density ratios and reflection densities of the respective inks. Ink contains dyes and a solvent. The solvent contains various additives such as a surfactant and a humectant. These additives control the ejection characteristics from the head and absorption characteristics on the image printing paper.

TABLE 1

| | C1 | C2 | M1 | M2 | Y1 | Y2 |
|---|---|---|---|---|---|---|
| Dye density ratio (%) | 3 | 0.9% | 3.5% | 0.9% | 3.5% | 0.9% |
| Reflection density (O.D.) | 1.88 | 0.51 | 1.58 | 0.59 | 1.58 | 0.59 |

| | K1 | K2 | K3 | K4 | K5 | K6 |
|---|---|---|---|---|---|---|
| Dye density ratio (%) | 4.8% | 2.4% | 1.2% | 0.6% | 0.3% | 0.15% |
| Reflection density (O.D.) | 1.67 | 0.96 | 0.51 | 0.27 | 0.13 | 0.07 |

Using these inks, one pixel of each of CMY inks is formed by two ink dots at maximum, and one pixel of each of K inks is formed by four ink dots at maximum. The results are shown in FIGS. 2B and 2C. A number in these tables represents the number of ink dots to be ejected to form one pixel, and "0" means that the ink is not ejected. As a density level, a value corresponds to an 8-bit input image signal (0 to 255: 0 represents the highest density) of CMY. More specifically, multilevel processing in five levels is performed for CMY colors, and multilevel processing in 43 levels is performed for K colors in the monochromatic region in correspondence with a 12-bit input image signal (0 to 4,095: 0 represents the highest density).

As described above, in this embodiment, to print using chromatic (Y, M, and C) inks, a table as shown in FIG. 2B which can correspond to five density levels of each color ink is prepared. To print using monochromatic (BK) inks, a table as shown in FIG. 2C which can correspond to 42 density levels, i.e., larger in number than the density levels (the number of gradation expressions) of the chromatic (Y, M, and C) inks, is prepared.

Printing is performed by selecting an ink type combination corresponding to the gradation value to be printed.

When the above-described processing of pixel-of-interest selection 12 and ink type distribution processing 13 is repeated for all pixels on the basis of the density data CD of the image, the binary signals d1, d2, d3 . . . representing ejection/non-ejection of the heads with different densities are generated for the respective pixels. The above processing is sequentially performed for each color of the monochromatic and color images using the corresponding ink type distribution table. An image processing section may be arranged for each color of monochromatic and color images to perform parallel processing.

For printing, the sheet 501 is fed from the left of FIG. 2A between the rollers 502 and 503 by a feeding device (not shown). The sheet is intermittently fed in the X direction by a predetermined distance. While the sheet stops, the motor 521 rotates to move the carriage in the Y direction at a predetermined speed. As the heads on the carriage pass over the sheet, nozzle ejection instruction signals corresponding to the image signal are sent by a control circuit shown in FIGS. 5 and 6, and droplets are selectively ejected from the nozzles in accordance with the signals. While the heads pass over the sheet and are at positions separated from the sheet surface, the motor 507 moves the sheet in the X direction by a predetermined distance and stops. The motor 507 moves the sheet at a predetermined speed again, and droplets are selectively ejected again. By repeating this operation, a desired image is finally printed on the sheet. The printed sheet is conveyed to the left of FIG. 2A by the rollers 504 and 506 and delivered to the left of FIG. 2A by a convey device (not shown).

Figure 7:
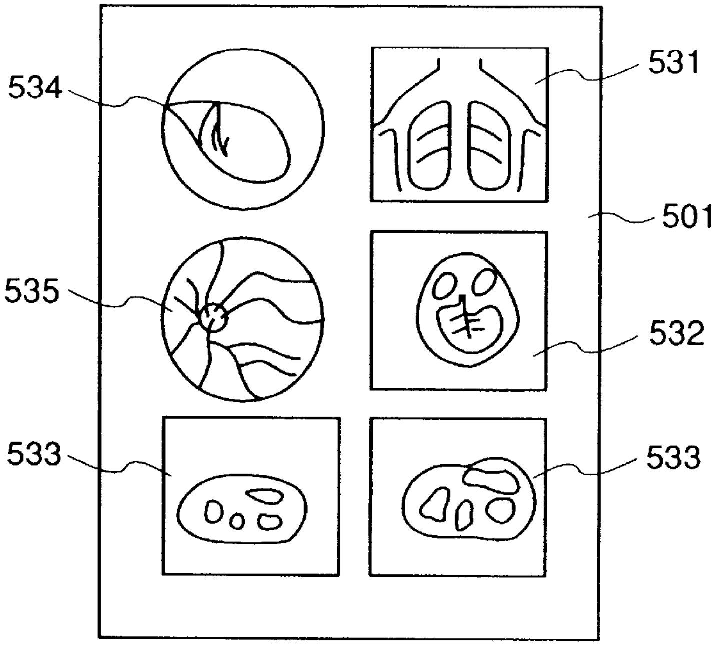
FIG. 7 is a view showing an image print example.

FIG. 7 shows a print example by this printing apparatus. Reference numeral 531 denotes a radiograph; 532, a CT image; and 533, MRI images, which are expressed as monochromatic images with 12-bit gradation. Reference numeral 534 denotes an endoscopic image; and 535, a retinal image, which are expressed as color images with 8-bit gradation. Images of one patient printed on one sheet in this way can be conveniently dealt with.

Figure 8:
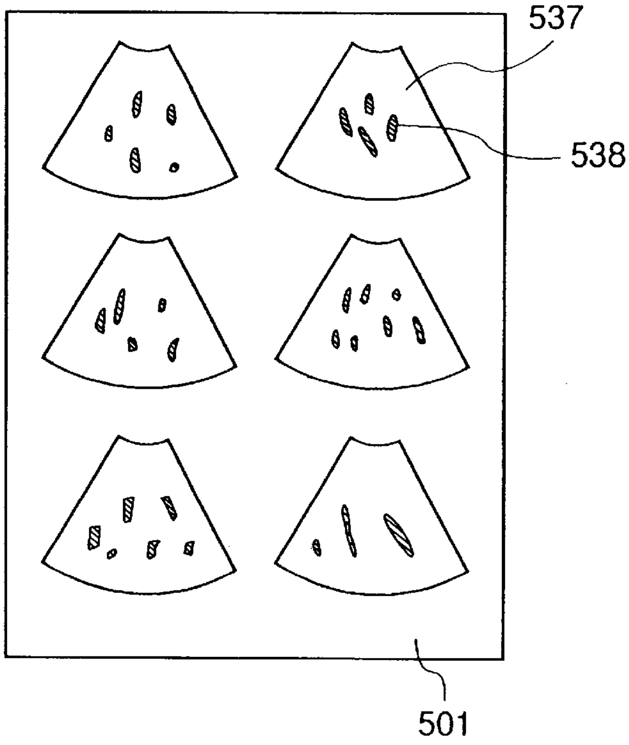
FIG. 8 is a view showing another image print example.

FIG. 8 shows another image print example. Reference numeral 537 denotes a color doppler ultrasonic image. Most portions of this image are expressed as monochromatic high-gradation images. Only solid portions 538 are expressed as color images for representing the blood stream states in different colors.

An algorithm for printing a high-gradation image using three or more black inks with different densities is disclosed in, e.g., Japanese Patent Application No. 9-78423. An algorithm for printing a color image using two color inks with different densities is disclosed in, e.g., Japanese Patent Laid-Open No. 6-226998. When monochromatic and color images are to be printed in different regions, a corresponding algorithm is used for each region.

[Image Printing Apparatus of Second Embodiment]

Figure 9:
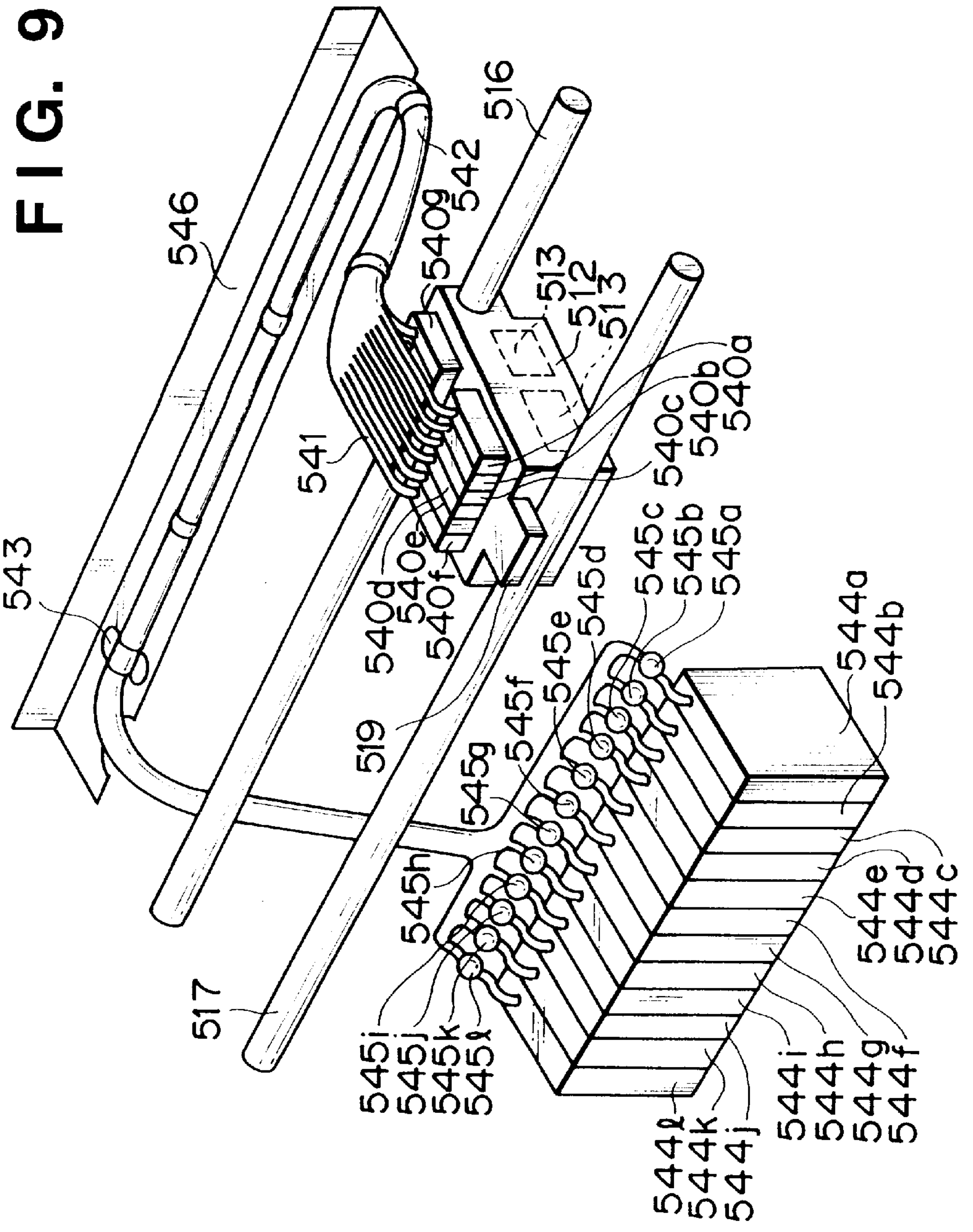
FIG. 9 is a perspective view showing an ink-jet printing apparatus of the second embodiment.

FIG. 9 shows an image printing apparatus of the second embodiment.

Certain identical constituent elements that are shown in FIG. 1 are not illustrated in FIG. 9.

Referring to FIG. 9, reserve tanks 540*a* to 540*l* are attached to heads 513 to store a predetermined amount of ink. A tube 541 extends from each of the reserve tanks 540*a* to 540*l*. These tubes are connected to ink tanks 544*a* to 544*l* through pumps 545*a* to 545*l*, respectively. When ink in a reserve tank is consumed, ink is supplied from a corresponding ink tank to the reserve tank through a corresponding pumps. The tubes can be detached from the ink tanks by an attaching/detaching mechanism (not shown). The ink tanks can also be detached from the apparatus after the tubes are detached. When an ink tank becomes empty, the tube is removed, the ink tank is exchanged with a new ink tank, and the tube is attached again, thereby supplying ink. The types of inks are the same as in the first embodiment. The tubes are bundled as a tube bundle 542 and fixed by a tube fixing member 543 at its intermediate portion. Between the reserve tanks and tube fixing member, the tube bundle is placed on a tube guide 546. When the carriage moves, the tube bundle can freely move on the tube guide not to impede movement of the carriage.

Printing is the same as in the first embodiment. However, since the capacity of an ink tank is much larger than that of an ink cartridge, the ink tank exchange frequency is lower than the ink cartridge exchange frequency even in printing a large quantity of image or data, so the ink supply frequency is also low.

[Image Printing Apparatus of Third Embodiment]

Figure 10:
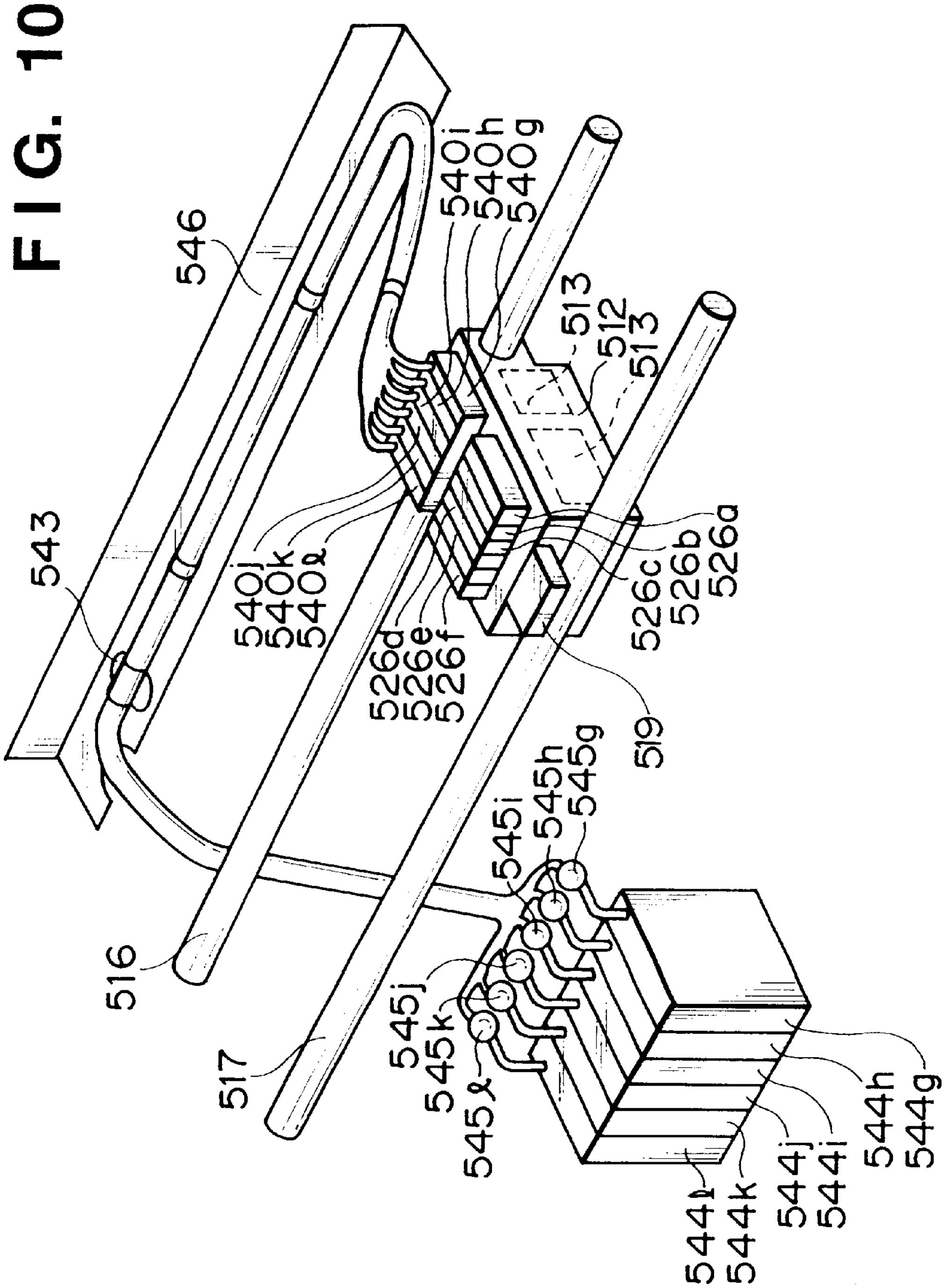
FIG. 10 is a perspective view showing an ink-jet printing apparatus of the third embodiment.

FIG. 10 shows an image printing apparatus of the third embodiment. Certain identical constituent elements that are shown in FIG. 1 are not illustrated in FIG. 10.

Referring to FIG. 10, ink cartridges 526*a* to 526*f* are attached to heads 513*a* to 513*f*, respectively, as in FIG. 1. Reserve tanks 540*g* to 540*l* are attached to heads 513*g* to 513*l*, respectively, as in FIG. 9. A tube is connected to each reserve tank, so the reserve tanks are connected to ink tanks 544*g* to 544*l* through pumps 545*g* to 545*l*, respectively. For the heads 513*a* to 513*f*, ink is supplied by exchanging the ink cartridges. For the heads 513*g* to 513*l*, ink is supplied by exchanging the ink tanks 544*g* to 544*l*. With this arrangement, the number of ink tubes, ink tanks, and pumps is smaller than that in FIG. 9, resulting in a simple apparatus. For the heads 513*a* to 513*f*, labor for exchanging the ink cartridges increases, as compared to FIG. 9. However, this poses no serious problem because the number of color regions in an image as shown in FIG. 7 or 8 is normally small due to the following reason.

A monochromatic image such as a radiograph or a CT/MRI image which requires a high gradation level tends to be printed on a large sheet. For example, an A4 sheet is often used to print a color image, and a folio (35×43 cm) is used to print a monochromatic high-gradation image. A monochromatic high-gradation image is printed with a maximum density, i.e., a value CD of about 3.0 in many cases.

As described above, when an image printing apparatus is used to print a medical image, the consumption amount of black ink is much larger than that of color inks. Color inks whose consumption amount is relatively small can be supplied from cartridges without considerably increasing the exchange frequency. That is, with the arrangement shown in FIG. 10, labor for ink supply does not significantly increase, and the apparatus can be simplified.

[Other Embodiments]

The ink-jet scheme is not particularly limited. In the embodiments, liquid ink is used. However, solid ink may be melted and ejected. In this case, ink is supplied by exchanging solid ink.

The sheet size is not limited to one type. Especially, since monochromatic and color images preferably use different sheet sizes, the advantages of the present invention increase by allowing use of sheets of a plurality of types.

The sheet can be of a reflective or transparent type. For medical images, a reflective sheet is preferably used to print a color image, and a transparent sheet is preferably used to print a monochromatic image. Hence, the advantages of the present invention increase by allowing use of both reflective and transparent sheets.

In the embodiments, the sheet is intermittently fed, and while the sheet stops, the head is moved in a direction perpendicular to the sheet feed direction for printing. However, the scheme is not limited to this. A linear fixed head which covers the sheet width may be arranged in a direction perpendicular to the sheet feed direction such that printing is performed while the sheet is fed at a predetermined speed. In this case, heads having a length covering the sheet width are attached for the respective inks.

In the third embodiment, black inks are supplied by a tube supply scheme, and color inks are supplied by a cartridge supply scheme. However, the tube supply scheme may be used for some of the black inks. In this case, inks whose use amounts are large are preferably supplied by the tube scheme. Since a medical image is often printed together with a background having a maximum density, the use amount of dark black ink tends to increase. Hence, dark black ink can be supplied by the tube supply scheme. Conversely, when color inks are supplied by the tube supply scheme, and black inks are supplied by the cartridge supply scheme, this apparatus is suitable to mainly print color images and few monochromatic images.

Some color inks may be omitted. For example, when a monochromatic image is to be partially emphasized, marked with colors for layer discrimination, or added with notes instead of printing a vital image for medical use, no full-color images need be printed, and some color inks suffice.

Since the above embodiments use, of ink-jet printing schemes, scheme using a means (e.g., an electrothermal transducer or laser light) for generating thermal energy as an energy used for ink ejection to change the ink states by the thermal energy, printing density and resolution can be increased.

As the representative arrangement or principle, the basic principle disclosed in U.S. Pat. Nos. 4,723,129 or 4,740,796 is preferably used. This scheme can be applied to either a so-called on-demand type or continuous type printer. This scheme is especially effective for an on-demand type printer because when at least one drive signal corresponding to print information and instructing a rapid increase in temperature beyond film boiling temperature is applied to an electrothermal transducer arranged in correspondence with a sheet or channel in which a liquid (ink) is held, thermal energy is generated in the electrothermal transducer, film boiling occurs on the plane of thermal action of the printhead, and finally, bubbles can be formed in the liquid (ink) corresponding to the drive signal in a one-to-one correspondence. The liquid (ink) is ejected from an ejection port as the bubbles grow or shrink, thereby forming at least one droplet. When this drive signal has a pulse shape, bubbles appropriately immediately grow or shrink. For this reason, the liquid (ink) can be ejected with good response.

As the drive signal having a pulse shape, a signal disclosed in U.S. Pat. Nos. 4,463,359 or 4,345,262 is suitable. When conditions described in U.S. Pat. No. 3,414,124 associated with the temperature increasing rate on a plane of thermal action are employed, more satisfactory printing can be performed.

As the arrangement of the printhead, not only a combination of ejection ports, channels, and electrothermal transducers disclosed in the above specifications (linear or rectangular channel) but also an arrangement disclosed in U.S. Pat. Nos. 4,558,333 or 4,459,600 in which the plane of thermal action is placed in a deflected region is also incorporated in the present invention. Alternatively, an arrangement disclosed in Japanese Patent Laid-Open No. 59-123670 in which a common slot is used as the ejection portion of an electrothermal transducer or an arrangement disclosed in Japanese Patent Laid-Open No. 59-138461 in which an opening for absorbing the pressure wave of a thermal energy is made to correspond to an ejection portion may be employed.

As a full-line-type printhead having a length corresponding to the width of a largest printing medium on which the printing apparatus can print, the length may be satisfied by combining a plurality of printheads, as disclosed in the above-described specifications, or an integrally formed printhead may be used.

A cartridge type printhead in which an ink tank is integrated with the printhead itself may be used, as being different from the constitution described in the above embodiments. Further, an exchangeable chip-type printhead which allows electrical connection to the apparatus main body or ink supply from the apparatus main body may be used.

A restoring means for the printhead is preferably added to the above-described printing apparatus because printing can be made further stable. More specifically, a capping means, cleaning means, pressurizing or suction means, or auxiliary heating means comprising an electrothermal transducer or another heating element, or a combination thereof can be used for the printhead. A pre-ejection mode for ejection not for printing can also be effectively used for stable printing.

The printing apparatus can have at least one of a print mode for printing with different complex colors and a full-color print mode using color mixture by integrally forming the printhead or combining a plurality of printheads.

The above embodiments have been described on the assumption that liquid ink is used. However, ink which hardens at room temperature or less, or softens/liquefies at room temperature may be used. A general ink-jet printer performs temperature control to set the ink viscosity within the stable ejection range by adjusting the temperature of ink itself within the range of 30° C. to 70° C. Hence, the ink need only liquefy when a use print signal is supplied.

To prevent an increase in temperature by positively using the thermal energy as an energy for changing the ink from the solid state to the liquid state, or prevent evaporation of ink, ink which hardens in an unused state and liquefies upon heating may be used. In any case, the present invention can be applied to an apparatus which applies a thermal energy corresponding to a print signal to liquefy ink and ejects the liquefied ink or an apparatus using ink which liquefies for the first time upon receiving a thermal energy and starts to harden upon reaching a printing medium. In this case, ink may oppose electrothermal transducers while being held in recessed portions or through-holes in a porous sheet, as disclosed in Japanese Patent Laid-Open No. 54-56847 or 60-71260. In the present invention, the most effective scheme for the ink is the above-described film boiling scheme.

In addition, the printing apparatus of the present invention may have the form of an image output terminal arranged integrally with or independently of an information processing device such as a computer, a copying machine combined with a reader, or a facsimile apparatus having transmission and reception functions.

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is realized even by supplying a storage medium storing software program codes for realizing the functions of the above-described embodiments to a system or an apparatus, and causing the computer (or a CPU or an MPU) of the system or the apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, a hard disk, an optical disk, a magnetooptical disk, a CD-ROM, a CD-R, a magnetic tape, a nonvolatile memory card, a ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As has been described above, according to the embodiments, the image printing apparatus comprises the color printheads 513*a* to 513*f* capable of ejecting color ink of at least one type, the monochromatic printheads 513*g* to 513*l* capable of ejecting monochromatic ink, and a printing control section for causing the printheads to eject the ink onto a sheet while moving the printheads relative to the sheet to selectively print a color image or a monochromatic image. In addition, the number of density types of the monochromatic ink is increased as compared to that of any color ink. With this arrangement, color images and monochromatic images can be printed without exchanging the printing medium. Hence, color images and monochromatic images can be printed on one printing medium as needed.

Instead of separating an image including monochromatic and color regions into the monochromatic region and color region, the image signal of a monochromatic region of an image and that of a color region of the image may be independently received and printed on one medium. Alternatively, a plurality of monochromatic and color images may be received to print the images on one medium in units of regions.

As many apparently widely different embodiments of the present invention can be made without departing from the spirit and scope thereof, it is to be understood that the invention is not limited to the specific embodiments thereof except as defined in the appended claims.

What is claimed is:

1. An image printing apparatus comprising:

a first print nozzle group for ejecting at least one color ink;

a second print nozzle group for ejecting black ink; and print control means for causing said first and second print nozzle groups to eject the inks onto a printing medium while moving said first and second print nozzle groups relative to the printing medium to selectively print a color image and a black ink monochromatic image, wherein the number of density types of the black ink is greater than that of any color ink, wherein said first print nozzle group has a plurality of nozzles for ejecting inks having at least two different densities in correspondence with color ink of at least one type, and wherein said printing control means controls printing of a color image and the black ink monochromatic image having a greater number of gradation levels than that of each color of the color image on one printing medium.

2. The apparatus according to claim 1, wherein said image printing apparatus is used to print a medical image.

3. The apparatus according to claim 1, wherein said printing control means controls printing of the color image and the black ink monochromatic image in different print regions on the one printing medium.

4. The apparatus according to claim 3, wherein said printing control means controls printing of the images in a color image print region and a monochromatic image print region on the basis of an image signal sent from an external device.

5. The apparatus according to claim 1, wherein the at least one color ink comprise three color inks of cyan, magenta, and yellow, or red, green, and blue.

6. The apparatus according to claim 1, wherein the number of density types of the at least one color ink is two at maximum, and the number of density types of the black inks is not less than three.

7. The apparatus according to claim 1, wherein of said nozzle groups, ink cartridges are provided for predetermined nozzle groups of at least one type of ink to supply the inks, and ink supply means are connected to remaining nozzle groups to supply the inks.

8. The apparatus according to claim 7, wherein color inks are supplied by said ink cartridges, and black inks are supplied by said ink supply means.

9. A method of controlling an image printing apparatus comprising a first print nozzle group for ejecting at least one color ink, a second print nozzle group for ejecting black inks, the number of density types of the black inks is greater than that of any color ink, and said first print nozzle group has a plurality of nozzles for electing inks having at least two different densities in correspondence with color ink of at least one type, said method comprising the steps of:

causing said first and second print nozzle groups to eject the inks onto a printing medium while moving said first and second print nozzle groups relative to the printing medium to selectively print a color image and a black ink monochromatic image; and printing the color image and the monochromatic image having a greater number of gradation levels than that of each color of the color image on one printing medium.

10. The method according to claim 9, wherein the images are printed in a color image print region and a monochromatic image print region on the basis of an image signal sent from an external device.

11. The method according to claim 9, wherein the at least one color ink comprise three color inks of cyan, magenta, and yellow, or red, green, and blue.

12. The method according to claim 9, wherein the number of density types of the at least one color ink is two at maximum, and the number of density types of the black inks is not less than three.

13. The method according to claim 9, wherein of said nozzle groups, ink cartridges are provided for predetermined nozzle groups of at least one type of ink to supply the inks, and ink supply means are connected to remaining nozzle groups to supply the inks.

14. The method according to claim 9, wherein the color image and the black ink monochromatic image are printed in different print regions on one printing medium.

15. A printing apparatus for performing gradation printing comprising:

printing units using a plurality of black inks having different densities and at least one color ink having at least two densities, wherein the number of density types of the black ink is greater than that of any color ink, and the number of gradation levels expresssable by the plurality of black inks is greater than the number of gradation levels expressable by the at least one color ink.

16. The apparatus according to claim 15, further comprising a combination table of the at least one plurality of black inks having different densities and a combination table of the at least one color ink, and the number of gradation levels of the table corresponding to the black inks is larger than the number of gradation levels of the table corresponding to the at least one color ink.

* * * * *

UNITED STATES PATENT AND TRADEMARK OFFICE

CERTIFICATE OF CORRECTION

PATENT NO. : 6,234,606 B1
DATED : May 22, 2001
INVENTOR(S) : Suzuki

It is certified that error appears in the above-identified patent and that said Letters Patent is hereby corrected as shown below:

<u>Column 3,</u>
Line 64, "aside" should read -- a side --.

<u>Column 9,</u>
Line 21, "scheme" should read -- a scheme --.

Signed and Sealed this

Sixteenth Day of April, 2002

*Attest:*

JAMES E. ROGAN
*Director of the United States Patent and Trademark Office*

*Attesting Officer*